US008708394B1

(12) United States Patent
Sytek et al.

(10) Patent No.: US 8,708,394 B1

(45) Date of Patent: Apr. 29, 2014

(54) TORSION ROD ISOLATOR

(71) Applicants: Christopher J Sytek, Burton, MI (US); Randy Ihrke, Auburn Hills, MI (US); Christopher J Duke, White Lake, MI (US)

(72) Inventors: Christopher J Sytek, Burton, MI (US); Randy Ihrke, Auburn Hills, MI (US); Christopher J Duke, White Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/715,150

(22) Filed: Dec. 14, 2012

(51) Int. Cl.

| | |
|---|---|
| ***B62D 25/12*** | (2006.01) |
| ***F16F 1/16*** | (2006.01) |
| ***E05D 1/04*** | (2006.01) |
| ***E05F 1/12*** | (2006.01) |

(52) U.S. Cl.

CPC ... *F16F 1/16* (2013.01); *E05D 1/04* (2013.01); *E05F 1/1238* (2013.01); *B62D 25/12* (2013.01)

USPC .................................. 296/76; 16/308; 49/386

(58) Field of Classification Search

CPC ......... B62D 25/12; E05D 1/04; E05F 1/1033; E05F 1/123; E05F 1/1238; F16F 1/16

USPC .................................. 296/76; 16/308; 49/386

See application file for complete search history.

(56) References Cited

U.S. PATENT DOCUMENTS

| | | | | |
|---|---|---|---|---|
| 2,916,763 | A | 9/1955 | Wagner | |
| 4,226,348 | A * | 10/1980 | Dottor et al. | 224/42.34 |
| 4,419,789 | A | 12/1983 | Matsui et al. | |
| 4,949,426 | A | 8/1990 | Komaki | |
| 5,873,619 | A * | 2/1999 | Lewkoski et al. | 296/76 |
| 6,637,531 | B2 | 10/2003 | Palenchar et al. | |
| 6,846,030 | B2 * | 1/2005 | Koehler et al. | 296/50 |

* cited by examiner

*Primary Examiner* — Dennis H Pedder

(74) *Attorney, Agent, or Firm* — Ralph E Smith

(57) ABSTRACT

A vehicle may include a body, a closure member, a hinge assembly and a sleeve. The body may define a cavity having an opening. The closure member may be movable relative to the cavity to provide access to the cavity. The hinge assembly may be attached to the body and the closure member and may include first and second torsion rods extending between first and second sides of the opening of the cavity. The first and second torsion rods may urge the closure member toward an open position. The sleeve may be attached to the first torsion rod and may include an outer surface having a profile defining a plurality of peaks and valleys. The outer surface may contact the second torsion bar to prevent direct contact between the first and second torsion rods.

20 Claims, 3 Drawing Sheets

TORSION ROD ISOLATOR

FIELD

The present disclosure relates to an isolator for a torsion rod.

BACKGROUND

Many vehicles include a trunk or other storage cavity having a deck lid that is moveable between open and closed positions to selectively allow and restrict access to the cavity. A hinge assembly may facilitate movement of the deck lid between the open and closed positions. The hinge assembly may include torsion rods that urge the deck lid toward the open position.

SUMMARY

The present disclosure provides a vehicle that may include a body, a closure member, a hinge assembly and a sleeve. The body may define a cavity having an opening. The closure member may be movable relative to the cavity to provide access to the cavity. The hinge assembly may be attached to the body and the closure member and may include first and second torsion rods extending between first and second sides of the opening of the cavity. The first and second torsion rods may urge the closure member toward an open position. The sleeve may be attached to the first torsion rod and may include an outer surface having a profile defining a plurality of peaks and valleys. The outer surface may contact the second torsion bar to prevent direct contact between the first and second torsion rods.

In some embodiments, the second torsion rod may contact two or more of the peaks.

In some embodiments, the first and second torsion rods may be angled relative to each other.

In some embodiments, the sleeve may be spaced apart from first and second ends of the first torsion rod.

In some embodiments, the sleeve may be an elongated member having first and second ends. The peaks and valleys may extend from the first end to the second end.

In some embodiments, the peaks may extend substantially parallel to each other.

In some embodiments, the sleeve may include an inner channel that receives the first torsion rod. The sleeve may include a slot in communication with the inner channel. The first torsion rod may be received into the inner channel through the slot.

In some embodiments, the first torsion rod may be engaged with the sleeve by a snap fit.

In some embodiments, the sleeve may be formed from an elastomeric material.

The cavity may include a cargo compartment, a passenger compartment or an engine and/or motor compartment of the vehicle. The closure member may include a deck lid (i.e., a trunk lid), a tailgate or liftgate, a hood, or a door, for example.

In another form, the present disclosure provides a hinge assembly that may include first and second hinge members, first and second torsion rods, and a sleeve. The first hinge member may be fixedly attached to a closure member and movably attached to a structure defining an opening. The first hinge member may be disposed proximate a first end of the opening. The second hinge member may be fixedly attached to the closure member and movably attached to the structure. The second hinge member may be disposed proximate a second end of the opening. The first torsion rod may include a first end attached to the first hinge member for movement therewith and a second end fixed relative to the structure proximate the second hinge member. The second torsion rod may include a first end attached to the second hinge member for movement therewith and a second end fixed relative to the structure proximate the first hinge member. The sleeve may be attached to the first torsion rod and may include an outer surface having a profile defining a plurality of peaks and valleys. The outer surface may contact the second torsion bar to prevent direct contact between the first and second torsion rods.

In some embodiments, the second torsion rod may contact two or more of the peaks.

In some embodiments, the first and second torsion rods may be angled relative to each other.

In some embodiments, the sleeve may be spaced apart from the first and second ends of the first torsion rod.

In some embodiments, the sleeve may be an elongated member having first and second ends. The peaks and valleys may extend from the first end of the sleeve to the second end of the sleeve.

In some embodiments, the peaks may extend substantially parallel to each other.

In some embodiments, the sleeve may include an inner channel that receives the first torsion rod.

In some embodiments, the sleeve may include a slot in communication with the inner channel. The first torsion rod may be received into the inner channel through the slot.

In some embodiments, the first torsion rod may be engaged with the sleeve by a snap fit.

In some embodiments, the sleeve may be formed from an elastomeric material.

In some embodiments, the closure member may be a deck lid (i.e., a trunk lid) and the opening may be a trunk-cavity opening. In some embodiments, the opening may include an opening for any other cargo compartment, a passenger compartment or an engine and/or motor compartment of the vehicle. In some embodiments, the closure member may include a tailgate or liftgate, a hood, or a door, for example.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

DETAILED DESCRIPTION

Figure 1:
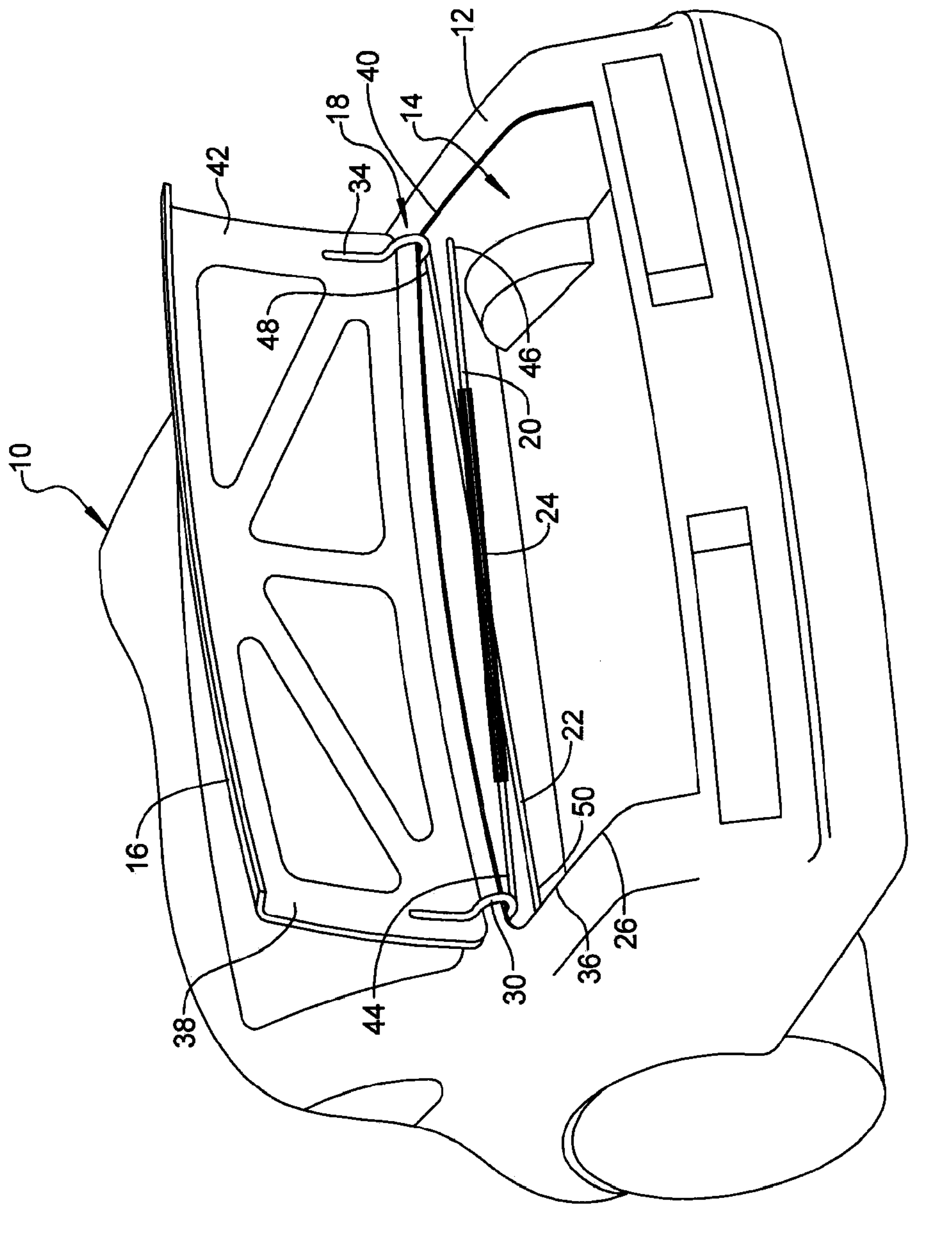
FIG. 1 is a partial perspective view of a vehicle having a closure member and a hinge assembly according to the principles of the present disclosure.

In an exemplary embodiment and with reference to FIGS. 1-4, a vehicle 10 is provided that may include a body 12 that may define a cavity 14 or a plurality of cavities. The vehicle 10 may also include a closure member 16 or a plurality of closure members. Each closure member 16 may be associated with a corresponding cavity 14 and may be attached to the body 12 by a hinge assembly 18. The hinge assembly 18 may facilitate movement of the closure member 16 relative to the body 12 and the cavity 14 between open and closed positions to selectively allow and restrict access to the cavity 14. As will be subsequently described, the hinge assembly 18 may include first and second torsion rods 20, 22 and an isolator sleeve 24. The first and second torsion rods 20, 22 may be configured to bias the closure member 16 toward the open position. The sleeve 24 may be configured to reduce or prevent direct contact between the first and second torsion rods 20, 22, thereby reducing the transmission of vibration between the first and second torsion rods 20, 22 and reducing undesirable sounds produced by such vibrations.

While the cavity 14 is shown in FIG. 1 as being a trunk of an automobile, the cavity 14 could include or be a part of any other cargo or storage compartment (e.g., a bed of a pickup truck or a cargo compartment of a hatchback vehicle, a van or a sport-utility-vehicle), a passenger compartment, or an engine and/or motor compartment, for example. Likewise, while the closure member 16 is shown in FIG. 1 as being a deck lid (i.e., a trunk lid), the closure member 16 could be a tailgate, liftgate, lid or door corresponding to the cargo, passenger or engine and/or motor compartment to selectively allow and restrict access thereto. As described above, the closure member 16 may be movably attached to the body 12 by the hinge assembly 18. When the closure member 16 is in the open position (shown in FIG. 1), the closure member 16 exposes an opening 26 of the cavity 14 to allow access to the cavity 14 from the exterior of the vehicle 10. In the closed position, the closure member 16 may close off the opening 26 to restrict or prevent access to the cavity 14 from the exterior of the vehicle 10.

The hinge assembly 18 may include first, second, third and fourth hinge members 28, 30, 32, 34 (shown schematically in FIG. 2), the first and second torsion rods 20, 22, and the sleeve 24. The first, second, third and fourth hinge members 28, 30, 32, 34 can include or be parts of any suitable hinge mechanism, such as the hinges disclosed in U.S. Pat. No. 4,419,789 or U.S. Pat. No. 2,916,763, for example, the disclosures of which are incorporated herein by reference.

The first hinge member 28 may be attached to the body 12 proximate a first end 36 of the opening 26 of the cavity 14. The second hinge member 30 may be fixedly attached to a first end 38 of the closure member 16 and may be attached to the first hinge member 28 for movement relative thereto between the open and closed positions. The third hinge member 32 may be attached to the body 12 proximate a second end 40 of the opening 26 of the cavity 14. The fourth hinge member 34 may be fixedly attached to a second end 42 of the closure member 16 and may be attached to the third hinge member 32 for movement relative thereto between the open and closed positions. In this manner, the first, second, third and fourth hinge members 28, 30, 32, 34 may connect the closure member 16 to the body 12 and facilitate movement of the closure member 16 relative to the body 12 between the open and closed positions.

Figure 2:
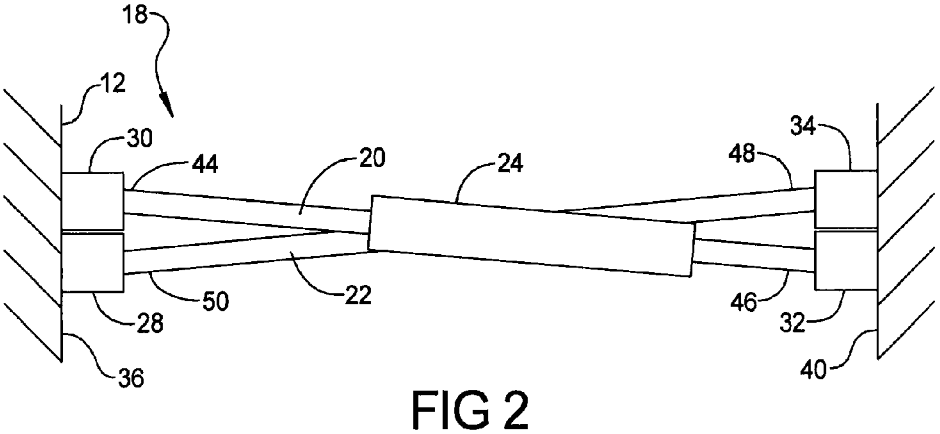
FIG. 2 is a schematic representation of the hinge assembly of FIG. 1.

The first torsion rod 20 may include a first end 44 and a second end 46. The first end 44 may be attached to the second hinge member 30. The second end 46 may be attached to the third hinge member 32 and/or otherwise fixed relative to the body 12. The second torsion rod 22 may include a first end 48 and a second end 50. The first end 48 may be attached to the fourth hinge member 34. The second end 50 may be attached to the first hinge member 30 and/or otherwise fixed relative to the body 12. As shown in FIGS. 1 and 2, the first and second torsion rods 20, 22 may be angled relative to each other such that they cross each other at an intermediate location between the first ends 44, 48 and the second ends 46, 50.

Because the second ends 46, 50 of the first and second torsion rods 20, 22 are fixed relative to the body 12 and the first ends 44, 48 move with the second and fourth hinge members 30, 34 between the open and closed positions, movement of the closure member 16 between the open and closed positions causes the first and second torsion rods 20, 22 to resiliently twist. Resistance to this twisting causes the torsion rods 20, 22 to bias the closure member 16 toward the open position. That is, when the closure member 16 is in the open position, the torsion rods 20, 22 may be in a relaxed state; and when the closure member 16 is in the closed position, the torsion rods 20, 22 may be in a twisted state. In this manner, the tendency of the torsion rods 20, 22 to untwist (i.e., move toward the relaxed state) applies a biasing force to the second and fourth hinge members 30, 34 and the closure member 16 that urges the closure member 16 toward the open position. This biasing force assists a user in opening the closure member 16 and maintaining the closure member 16 in the open position until the user applies a force to the closure member 16 that overpowers the biasing force to move the closure member 16 to the closed position.

Figure 4:
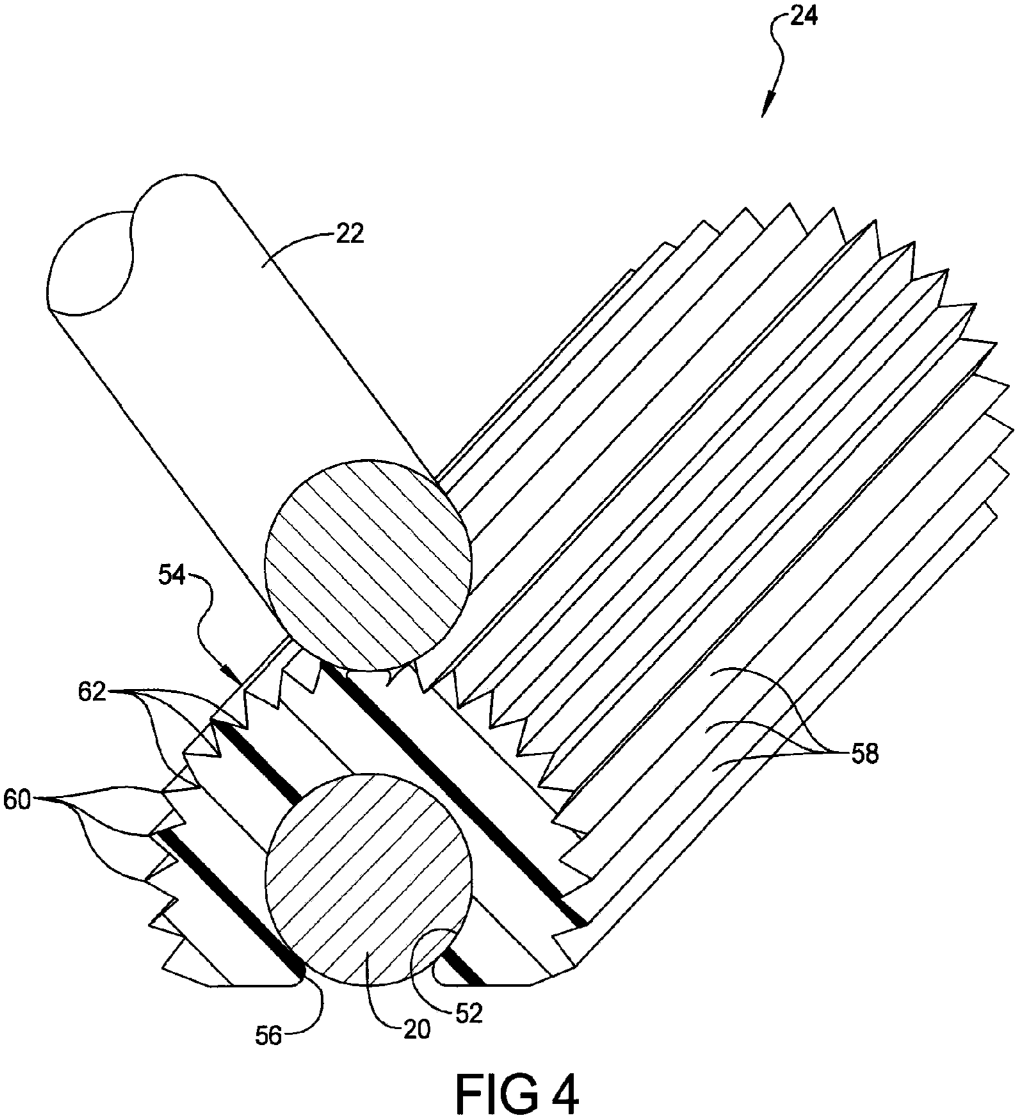
FIG. 4 is a partial perspective cross-sectional view of torsion rods and the sleeve of the hinge assembly according to the principles of the present disclosure.

As shown in FIGS. 1, 2 and 4, the first torsion rod 20 may include a sleeve 24 attached thereto between the first and second ends 44, 46. In other embodiments, the sleeve 24 could be disposed on the second torsion rod 22. In still other embodiments, the first and second torsion rods 20, 22 could each include a sleeve 24. The sleeve 24 may be an elongated polymeric or elastomeric member. For example, the sleeve 24 could be molded from EPDM (ethylene propylene diene monomer) rubber and/or any other material suitable for isolating or absorbing vibration.

Figure 3:
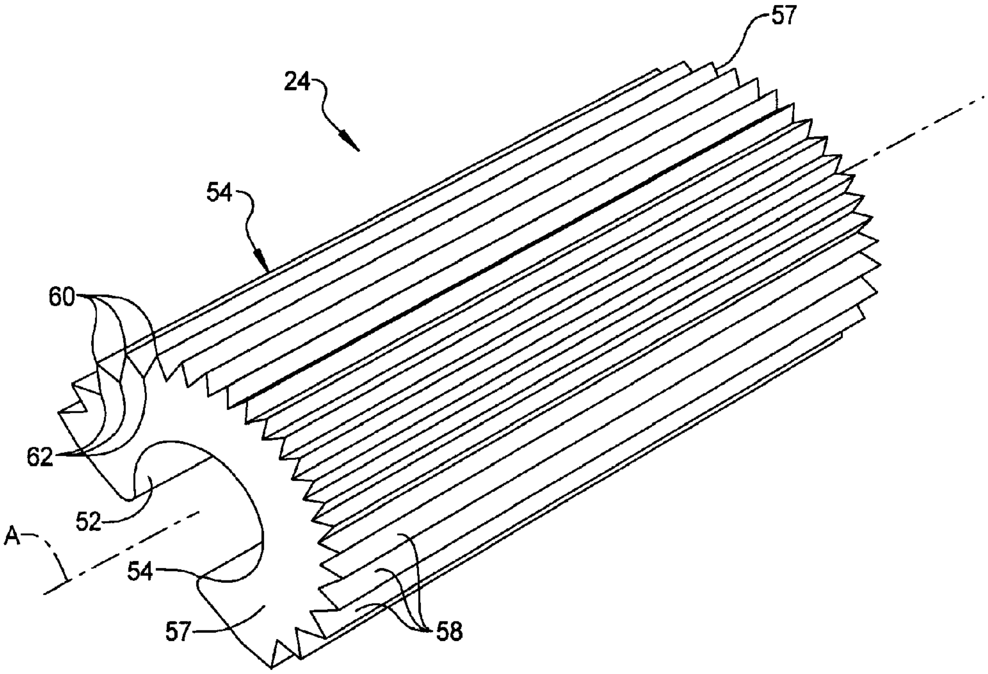
FIG. 3 is a perspective view of a sleeve of the hinge assembly according to the principles of the present disclosure.

As shown in FIGS. 3 and 4, the sleeve 24 could be a generally cylindrical member having an inner channel 52 and an outer surface 54. A slot 56 spanning the length of the sleeve 24 may extend into the inner channel 52. In this manner, the first torsion rod 20 may be received into the inner channel 52 through the slot 56 and retained therein by a snap fit, for example. It will be appreciated that the sleeve 24 could be retained on the first torsion rod 20 by any other suitable means. In some embodiments, the sleeve 24 could be molded over the first torsion rod 20.

The outer surface 54 may have a profile including a plurality of elongated ribs 58 that extend generally parallel to a longitudinal axis A (shown in FIG. 3) of the sleeve 24 between opposing axial ends 57 of the sleeve 24. The ribs 58 may be arranged in a generally circular or semicircular array and may define a plurality of peaks 60 and valleys 62. Each valley 62 may be disposed between adjacent peaks 60. The sleeve 24 could include any number of ribs 58 arranged and spaced apart from each other in any suitable configuration. In an exemplary embodiment, the sleeve 24 could include twelve evenly spaced ribs 58.

As shown in FIG. 4, when installed in the hinge assembly 18, the sleeve 24 may isolate the first and second torsion rods 20, 22 from each other so that the first and second torsion rods 20, 22 do not directly contact each other. In this manner, the sleeve 24 reduces or prevents the transmission of vibrations between the first and second torsion rods 20, 22, which reduces or eliminates noise produced by the hinge assembly 18 during operation of the vehicle 10.

As shown in FIG. 4, the second torsion rod 22 may contact a plurality of ribs 58 at or proximate the corresponding peaks 60. These multiple points of contact between the second torsion rod 22 and the sleeve 24 may spread a force associated with such contact over multiple distinct surfaces, thereby reducing wear of the sleeve 24. In this manner, the sleeve 24 is less likely to develop a flat spot due to wear that could induce "slapping" of the second torsion rod 22 against the sleeve 24 (i.e., repetitive impacting of the second torsion rod 22 against the sleeve due to vibration). Reducing or eliminating "slapping" in this manner may reduce or eliminate noises produced by the hinge assembly 18.

What is claimed is:

1. A vehicle comprising:
- a body defining a cavity having an opening;
- a closure member movable relative to the cavity to provide access to the cavity;
- a hinge assembly attached to the body and the closure member and including first and second torsion rods extending between first and second sides of the opening of the cavity, the first and second torsion rods urging the closure member toward an open position; and
- a sleeve attached to the first torsion rod and including an outer surface having a profile defining a plurality of peaks and valleys, the outer surface contacting the second torsion bar to prevent direct contact between the first and second torsion rods,
- wherein a cross section of the sleeve includes the plurality of peaks and valleys, the cross section defined by a plane that is perpendicular to a longitudinal axis of the first torsion rod.

2. The vehicle of claim 1, wherein the second torsion rod contacts two or more of the peaks.

3. The vehicle of claim 1, wherein the first and second torsion rods are angled relative to each other.

4. The vehicle of claim 1, wherein the sleeve is spaced apart from first and second ends of the first torsion rod.

5. The vehicle of claim 1, wherein the sleeve is an elongated member having first and second ends, the peaks and valleys extending from the first end to the second end.

6. The vehicle of claim 5, wherein the peaks extend substantially parallel to each other.

7. The vehicle of claim 5, wherein the sleeve includes an inner channel that receives the first torsion rod.

8. The vehicle of claim 7, wherein the sleeve includes a slot in communication with the inner channel, the first torsion rod being received into the inner channel through the slot.

9. The vehicle of claim 8, wherein the first torsion rod is engaged with the sleeve by a snap fit.

10. The vehicle of claim 1, wherein the closure member is a deck lid and the cavity is a trunk cavity.

11. A hinge assembly comprising:
- a first hinge member fixedly attached to a closure member and movably attached to a structure defining an opening, the first hinge member being disposed proximate a first end of the opening;
- a second hinge member fixedly attached to the closure member and movably attached to the structure, the second hinge member being disposed proximate a second end of the opening;
- a first torsion rod having a first end attached to the first hinge member for movement therewith and a second end fixed relative to the structure proximate the second hinge member;
- a second torsion rod having a first end attached to the second hinge member for movement therewith and a second end fixed relative to the structure proximate the first hinge member; and
- a sleeve attached to the first torsion rod and including an outer surface having a profile defining a plurality of peaks and valleys, the outer surface contacting the second torsion bar to prevent direct contact between the first and second torsion rods,
- wherein a cross section of the sleeve includes the plurality of peaks and valleys, the cross section defined by a plane that is perpendicular to a longitudinal axis of the first torsion rod.

12. The hinge assembly of claim 11, wherein the second torsion rod contacts two or more of the peaks.

13. The hinge assembly of claim 11, wherein the first and second torsion rods are angled relative to each other.

14. The hinge assembly of claim 11, wherein the sleeve is spaced apart from the first and second ends of the first torsion rod.

15. The hinge assembly of claim 11, wherein the sleeve is an elongated member having first and second ends, the peaks and valleys extending from the first end of the sleeve to the second end of the sleeve.

16. The hinge assembly of claim 15, wherein the peaks extend substantially parallel to each other.

17. The hinge assembly of claim 15, wherein the sleeve includes an inner channel that receives the first torsion rod.

18. The hinge assembly of claim 17, wherein the sleeve includes a slot in communication with the inner channel, the first torsion rod being received into the inner channel through the slot.

19. The hinge assembly of claim 18, wherein the first torsion rod is engaged with the sleeve by a snap fit.

20. The hinge assembly of claim 11, wherein the closure member is a deck lid and the opening is a trunk-cavity opening.

* * * * *